(12) United States Patent
Starke et al.

(10) Patent No.: US 10,488,237 B2
(45) Date of Patent: Nov. 26, 2019

(54) MEASUREMENT APPARATUS FOR MEASURING A FLOW RATE OF A FLUID

(71) Applicant: SICK ENGINEERING GMBH, Ottendorf-Okrilla (DE)

(72) Inventors: Eric Starke, Ottendorf-Okrilla (DE); Christian Schulz, Ottendorf-Okrilla (DE); Mario Künzelmann, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 0 days.

(21) Appl. No.: 15/945,931

(22) Filed: Apr. 5, 2018

(65) Prior Publication Data

US 2018/0299305 A1    Oct. 18, 2018

(30) Foreign Application Priority Data

Apr. 13, 2017  (EP) ..................... 17166569

(51) Int. Cl.
*G01F 1/66* (2006.01)
*G01F 15/18* (2006.01)

(52) U.S. Cl.
CPC ............ *G01F 1/662* (2013.01); *G01F 15/185* (2013.01); *G01F 1/667* (2013.01)

(58) Field of Classification Search
CPC .................... G01F 1/84; G01F 1/66
See application file for complete search history.

(56) References Cited

U.S. PATENT DOCUMENTS 6,789,419 B2    9/2004  Hennebelle
7,258,003 B2*   8/2007  Padmanabhan ......... G01F 1/684
                                                      73/204.26

(Continued)

FOREIGN PATENT DOCUMENTS

JP       2895704 B2       5/1999
RU     2 502 054 C1      12/2013
WO     2005/089432 A2    9/2005

OTHER PUBLICATIONS

Search Report dated Oct. 19, 2017 issued in corresponding European Application No. 17166569.8.

(Continued)

*Primary Examiner* — Jewel V Dowtin
(74) *Attorney, Agent, or Firm* — Nath, Goldberg & Meyer; Jerald L. Meyer; Stanley N. Protigal

(57) ABSTRACT

The invention relates to a measurement apparatus for measuring a flow rate of a fluid that flows with a main direction of flow in a circular line comprising an inlet section for conducting the fluid from the circular line into the measurement apparatus; an outlet section for conducting the fluid from the measurement apparatus into the circular line; a measurement section for connecting the inlet section to the outlet section; at least one ultrasound device for transmitting and/or receiving ultrasound waves, wherein the ultrasound device is arranged at a wall of the measurement section; and an evaluation unit for carrying out a time of flight difference measurement and for determining the flow rate, wherein the inlet section has a first superelliptic transitional shape and the outlet section has a second superelliptic transitional shape and the measurement section has a rectangular form, in particular having rounded corners.

14 Claims, 3 Drawing Sheets

(56) References Cited

U.S. PATENT DOCUMENTS

| | | | |
|---|---|---|---|
| 7,617,739 B1 * | 11/2009 | Dam | G01L 9/0022 |
| | | | 73/861.27 |
| 7,647,840 B2 | 1/2010 | Rickli | |
| 8,091,435 B2 | 1/2012 | Will et al. | |
| 8,375,807 B2 * | 2/2013 | Kossek | G01F 1/662 |
| | | | 73/861.18 |
| 8,931,353 B2 * | 1/2015 | Mokady | G01F 1/8409 |
| | | | 73/861.354 |
| 9,279,707 B2 * | 3/2016 | Wiest | G01F 1/662 |
| 9,863,300 B2 * | 1/2018 | Sakashita | B25J 15/08 |

OTHER PUBLICATIONS

Larsen, "Superelliptic Broadband Transition Between Rectangular and Circular Waveguides", Microwave Conference, 1st European, IEEE, Sep. 1969.

* cited by examiner

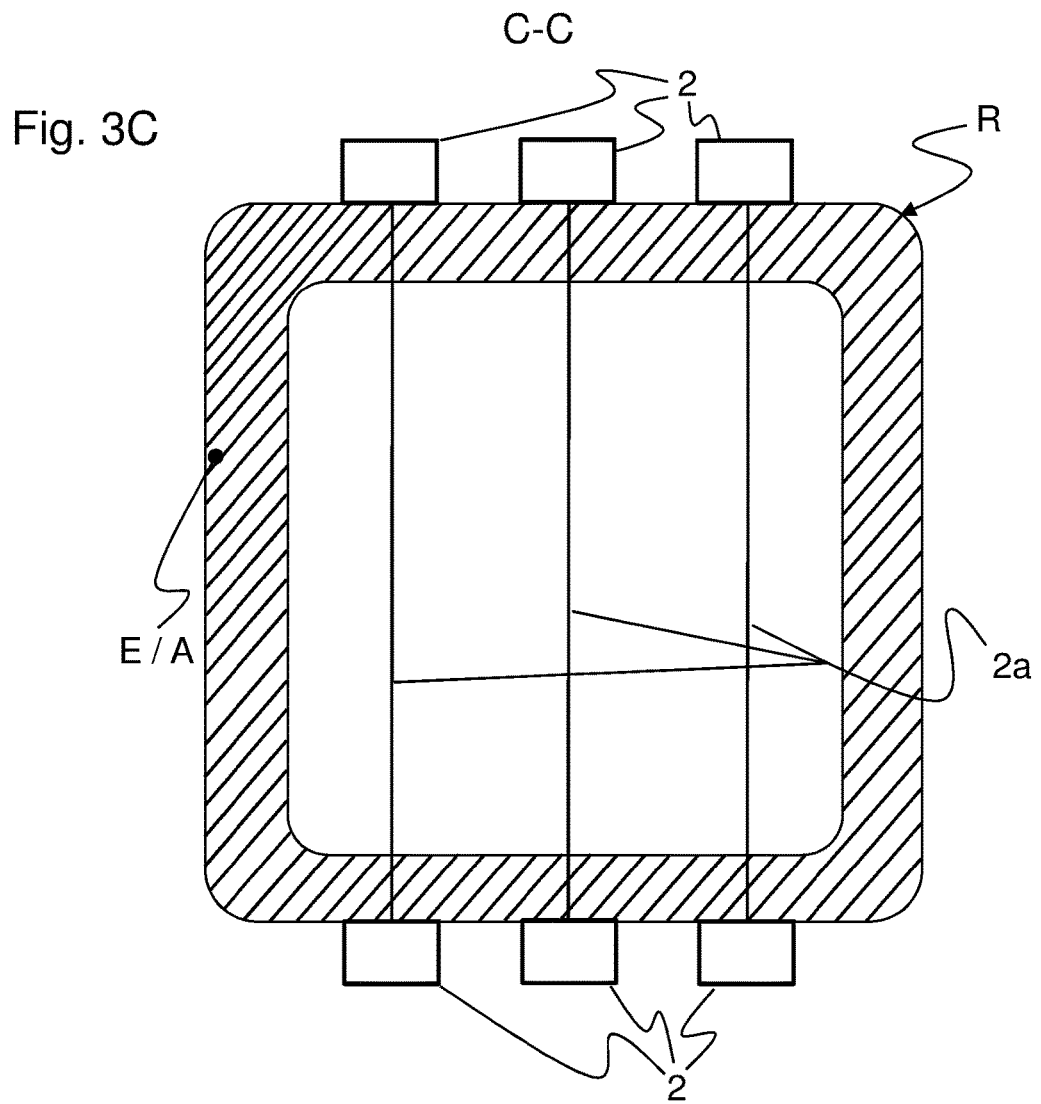

MEASUREMENT APPARATUS FOR MEASURING A FLOW RATE OF A FLUID

FIELD

The invention relates to a measurement apparatus for measuring a flow rate of a fluid that flows with a main direction of flow in a circular line.

BACKGROUND

In addition to various physical principles for determining the flow rate of the fluid in the line, preferably in a circular pipe, there is the use of ultrasound waves which are transmitted into the line. The flow rate of the flowing fluid and thus of the flow can be determined by means of the time of flight difference method.

In this respect, ultrasound waves are transmitted and received by a pair of ultrasound devices, in particular ultrasonic transducers, wherein the ultrasound devices are arranged mutually opposite at a wall of the line at the ends of a measurement path obliquely to the main direction of flow or to the flow of the fluid.

The ultrasound waves transported through the fluid are accelerated in the direction of flow and are decelerated against the direction of flow. The resulting time of flight difference is calculated using geometrical parameters to form a mean speed of the fluid from which the flow rate of the flowing fluid is determined.

An important and demanding area of application is represented by gas meters for natural gas pipelines in which, due to the huge gas volumes conveyed and to the value of the resource, even the smallest deviations in the measurement precision can result in highly noticeable value differences such as between actually conveyed volumes and measured volumes. This results in high monetary differences. The above-named measurement apparatus are used in this field of the measurement of large gas volumes due to their accuracy, freedom from servicing and self-diagnosis possibilities in gas transport and gas storage.

Since an ultrasound measurement path only samples the flow rate at defined positions, ultimately the mean flow rate over the total flow cross-section is approximated. High accuracies can therefore only be achieved if the flow is easily reproducible or has an undisturbed flow profile or if a plurality of measurement paths are able to resolve the irregularities.

On the use of a plurality of measurement paths at circular lines or pipes, the ultrasound devices can only be arranged at the wall of the circular lines such that diametrical measurement paths result. This means that the measurement paths intersect at the pipe center so that the measurement always takes place through the pipe center. A measurement signal hereby runs through a flow cross-section having the most speed gradients since a speed distribution of the fluid in a circular line is a parabola with a laminar flow. The measurement signal can thereby only deliver an imprecise average of the flow rate.

For this reason, non-round flow cross-sections in a measurement section of the measurement apparatus is of interest for a sampling of the flow profile.

SUMMARY

It is therefore an object of the invention to provide a measurement apparatus for measuring a flow rate of a fluid that enables an increased measurement quality of the flow rate.

The object is satisfied in accordance with the invention by a measurement apparatus for measuring a flow rate of a fluid that flows with a main direction of flow in a circular line, having an inlet section for conducting fluid from the circular line into the measurement apparatus, an outlet section for conducting the fluid from the measurement apparatus into the circular line, and a measurement section for connecting the inlet and outlet sections. At least one ultrasound device at a wall of the measurement section transmits and/or receives ultrasound waves, and the measurements are used in a time of flight difference measurement for determining the flow rate. The inlet section has a first superelliptic transitional shape and the outlet section has a second superelliptic transitional shape and the measurement section has a rectangular shape.

In this respect, the measurement apparatus in accordance with the invention for measuring a flow rate of a fluid that flows with a main direction of flow in a circular line comprises an inlet section for conducting the fluid from the circular line into the measurement apparatus; an outlet section for conducting the fluid from the measurement apparatus into the circular line; a measurement section for connecting the inlet section to the outlet section; at least one ultrasound device for transmitting and/or receiving ultrasound waves, wherein the ultrasound device is arranged at a wall of the measurement section; and an evaluation unit for carrying out a time of flight difference measurement and for determining the flow rate, wherein the inlet section has a first superelliptic transitional shape and the outlet section has a second superelliptic transitional shape and the measurement section has a rectangular form, in particular having rounded corners.

The advantage hereby results that a particularly homogeneous transitional geometry is possible from the circular line to the rectangular measurement section, in particular having rounded corners, of the measurement apparatus in accordance with the invention for a laminar low so that a small construction length of the measurement apparatus in accordance with the invention can be designed with a simultaneously homogenized flow.

In accordance with a preferred embodiment, the measurement apparatus in accordance with the invention is arranged in the circular line coaxially to the main flow of the fluid.

The first superelliptic transitional shape of the inlet section advantageously merges from a round cross-section that corresponds to the cross-section of the circular line to a rectangular cross-section, in particular having rounded corners, that corresponds to the rectangular shape of the measurement section so that no flow breakdown results on the transition of the fluid from the circular line to the rectangular measurement section, in particular having rounded corners, of the measurement apparatus in accordance with the invention.

The second superelliptic transitional shape of the outlet section of the measurement apparatus in accordance with the invention furthermore advantageously merges from a rectangular cross-section, in particular having rounded corners, that corresponds to the rectangular shape of the measurement section, to a round cross-section that corresponds to the cross-section of the circular line so that no eddying results at the outlet of the measurement apparatus in accordance with the invention.

In accordance with a further preferred embodiment, the superelliptic transitional shape is described by means of a formula $$\left(\frac{x}{a_{(z)}}\right)^{n(z)} + \left(\frac{y}{b_{(z)}}\right)^{n(z)} = 1,$$

wherein the semi-axes a(z) and b(z) and the exponent n(z) are each functions of coordinates of a meter axis z facing in the main direction of flow. x and y are the spatial coordinates perpendicular to the meter axis z. The exponent n(flange)=2 and the semi-axes a(z) and b(z) are in particular equal to a radius of the flange—a(flange)=b(flange)=R—in a circular flange section. The value for n(measurement section) is preferably greater than 2 in the region of the rectangular measurement section, in particular having rounded corners. Values of n(measurement section) greater than 5 are advantageous for a good approximation of a rectangular measurement section. The ratio of the semi-axes a and b to one another defines the cross-sectional ratio of the measurement section. Typical values are in particular $$\frac{a(\text{measurement section})}{b(\text{measurement section})} = [0, 1 \ldots 10].$$

In the inlet section and outlet section between the flange sections and the measurement section, the values of the semi-axes a(z) and b(z) and of the exponent n(z) are varied continuously as a function of the respective coordinates of the meter axis z, whereby large gradients in the contour change of the transitional shape can be precluded.

Furthermore, in accordance with a further preferred embodiment, the ultrasound device is arranged at the wall of the rectangular measurement section, in particular having rounded corners, of the measurement apparatus in accordance with the invention such that at least one measurement path of the ultrasound device is directed approximately in parallel with a side wall of the rectangular measurement section, in particular having rounded corners. This means that the measurement path is configured such that it is inclined in the main direction of flow along the meter axis z and is basically in parallel with the side wall of the measurement section.

The ultrasound device is advantageously arranged at the wall of the rectangular measurement section, in particular having rounded corners, such that a secant measurement path alignment results in the rectangular measurement section, in particular having rounded corners. The measurement signal hereby does not run through the flow cross-section having the most speed gradients so that an improved sampling density of the flow profile can result in a more exact averaging of the flow rate.

Preferred embodiments and further developments as well as further advantages of the invention can be seen from the dependent claims, from the following description and from the drawings.

BRIEF DESCRIPTION OF THE DRAWINGS

The invention will be explained in detail in the following with reference to embodiments and to the drawings. There are shown in the drawing:
FIG. 3C a schematic sectional view along a line C-C in FIG. 2.

DETAILED DESCRIPTION

Figure 1:
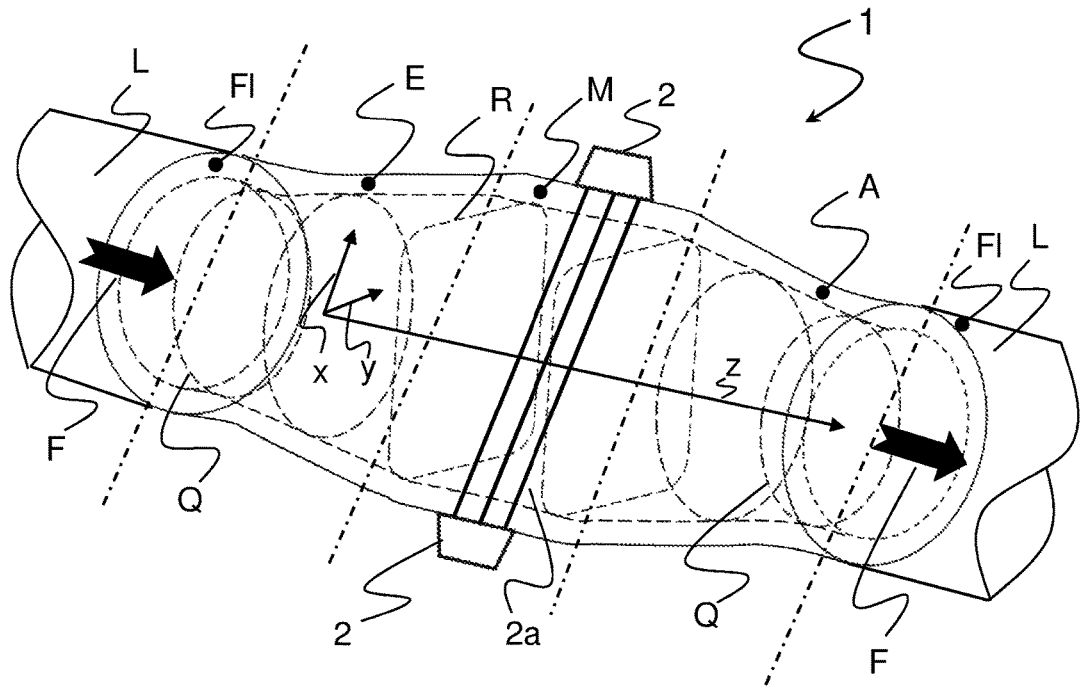
FIG. 1 a schematic 3D representation of a measurement apparatus in accordance with the invention.

A schematic 3D representation of a preferred embodiment of a measurement apparatus 1 in accordance with the invention is shown in FIG. 1 that measures a flow rate of a fluid F that flows with a main direction of flow in a circular line L. The fluid F can, for example, be natural gas, petroleum, or similar.

The measurement apparatus 1 is here arranged coaxially to the main flow of the fluid F in the circular line L.

The measurement apparatus 1 comprises a flange section Fl that connects the measurement apparatus 1 to the circular line L and that conducts the fluid F from the circular line L into the measurement apparatus 1.

The flange section Fl is adjoined by an inlet section E of the measurement apparatus 1 that has a first superelliptic transitional shape that extends from a start of the inlet section E up to a measurement section M of the measurement apparatus 1. The first superelliptic transitional shape merges from a round cross-section Q of the flange section Fl to a rectangular cross-section R, wherein in the following a "rectangular" cross-section R is understood such that the cross-section R preferably has a rectangular shape having edges approximately in parallel with one another and rounded corners. This in particular means that the cross-section R visually has straight, parallel edges.

The measurement section M of the measurement apparatus 1 has a rectangular shape that has the rectangular cross-section R, wherein the flow rate of the fluid F is measured within the measurement section M of the measurement apparatus 1. An outlet section A of the measurement apparatus 1 adjoins the measurement section M of the measurement apparatus 1, wherein the outlet section A is adjoined by a flange section Fl that conducts the fluid F whose flow rate is determined in the measurement section M of the measurement apparatus 1 back from the measurement apparatus 1 into the circular line L. This means that the measurement section M of the measurement apparatus 1 connects the inlet section E to the outlet section A of the measurement apparatus 1.

The outlet section A of the measurement apparatus 1 has a second superelliptic transitional shape that extends from the rectangular measurement section M of the measurement apparatus 1 and that is connected to the circular line L. In this respect, the second superelliptic transitional shape merges from the rectangular cross-section R to the round cross-section Q that corresponds to a round cross-section of the circular line L.

The transitional shape in the sense of the invention means the construction design of the shape of the inlet section or outlet section E and A respectively of the measurement apparatus 1. The shape does not typically correspond to a hollow truncated cone, but rather to a superelliptic hollow trunk.

The superelliptic transitional shape is described by means of a formula $$\left(\frac{x}{a_{(z)}}\right)^{n(z)} + \left(\frac{y}{b_{(z)}}\right)^{n(z)} = 1,$$

where a(z) and b(z) represent semi-axes of the superelliptic transitional shape. The semi-axes a(z) and b(z) are functions of the coordinates of the meter axis z facing the main direction of flow, where x and y are the spatial coordinates perpendicular to the meter axis z. The exponent n(z) is likewise a function of the coordinates of the meter axis z facing in the main direction of flow. In this respect, semi-axes a(z) and b(z) are to be understood as the characteristic radii of the superellipse. This means that as the observation of the shape of the measurement apparatus 1 along the meter axis z progresses in the main direction of flow, the values of the semi-axes a(z) and b(z) and of the exponent n(z) change continuously from the start of the inlet section E up to the end of the outlet section A.

The exponent n(z) is in particular equal to 2 in the circular flange section Fl of the measurement apparatus 1 and the semi-axes a(z) and b(z) are equal to the radius of the flange. In the region of the approximately rectangular measurement section M, the value for the exponent n(z) is greater than 2, with values of n greater than 5 being advantageous for a good approximation of a rectangular measurement section M. The ratio of the semi-axes a(z) and (z)b to one another defines the cross-sectional ratio of the measurement section M. Typical values are $$\frac{a(\text{measurement section})}{b(\text{measurement section})} = [0, 1 \ldots 10].$$

In other words, the values of the semi-axes a(z) and b(z) and of the exponent n(z) are changed continuously as a function of the respective coordinates of the meter axis z in the inlet region and outlet region E and A respectively between the flange section Fl and the measurement section M so that the superelliptic transitional shape of the measurement apparatus 1 can be achieved.

At least one ultrasound device 2 that transmits and/or receives ultrasound is arranged at a wall of the measurement section M of the measurement apparatus 1 so that an evaluation unit, not shown, determines the flow rate of the fluid F with reference to a measurement signal of the ultrasound device 2. In this respect, the evaluation unit carries out the determination of the flow rate by means of a time of flight difference measurement.

Figure 2:
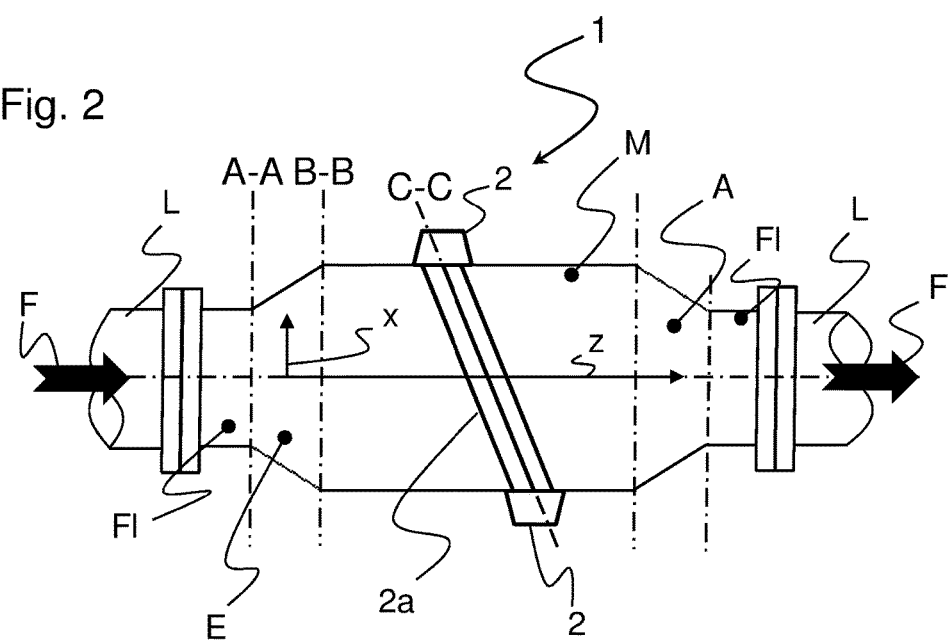
FIG. 2 a schematic side view of the measurement apparatus in accordance with the invention in accordance with FIG. 1.

As shown in the schematic side view in FIG. 2, the rectangular measurement section M of the measurement apparatus 1 enables an arrangement of the ultrasound device 2 at the wall such that at least one measurement path 2a of the ultrasound device 2 is directed in parallel with a side wall of the rectangular measurement section M of the measurement apparatus 1. A secant measurement path alignment of the ultrasound device 2 in particular results in the rectangular measurement section M of the measurement apparatus 1 so that the measurement signal of the measurement apparatus 1 can be detected over the total flow profile of the fluid F This means that the measurement path 2a is inclined along the meter axis z toward the main direction of flow and in parallel with the side wall of the rectangular measurement section M having rounded corners, with that side wall being spoken of to which the ultrasound device 2 is not attached.

In other words, the measurement path or measurement paths 2a of the ultrasound device 2 can be aligned in parallel with one another and do not intersect at the center of the circular line L. This enables a better sampling of the flow profile of the fluid F and thus a more exact value of the flow rate of the fluid F.

Figure 3A:
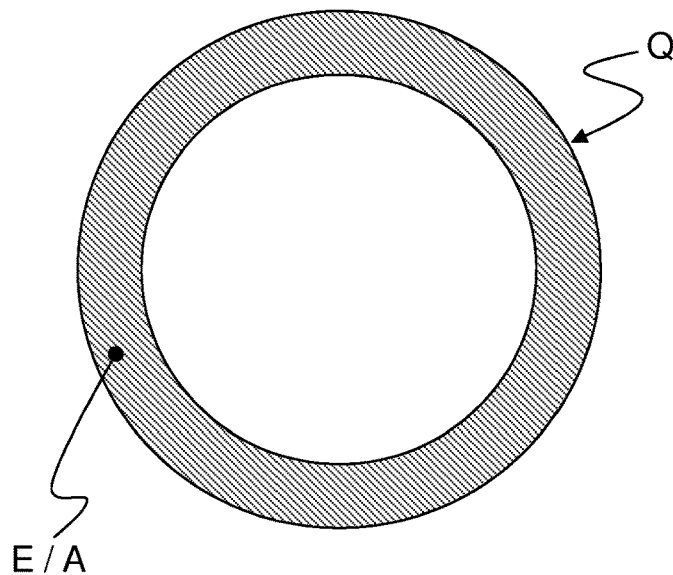
FIG. 3A a schematic sectional view along a line A-A in FIG. 2.
Figure 3B:
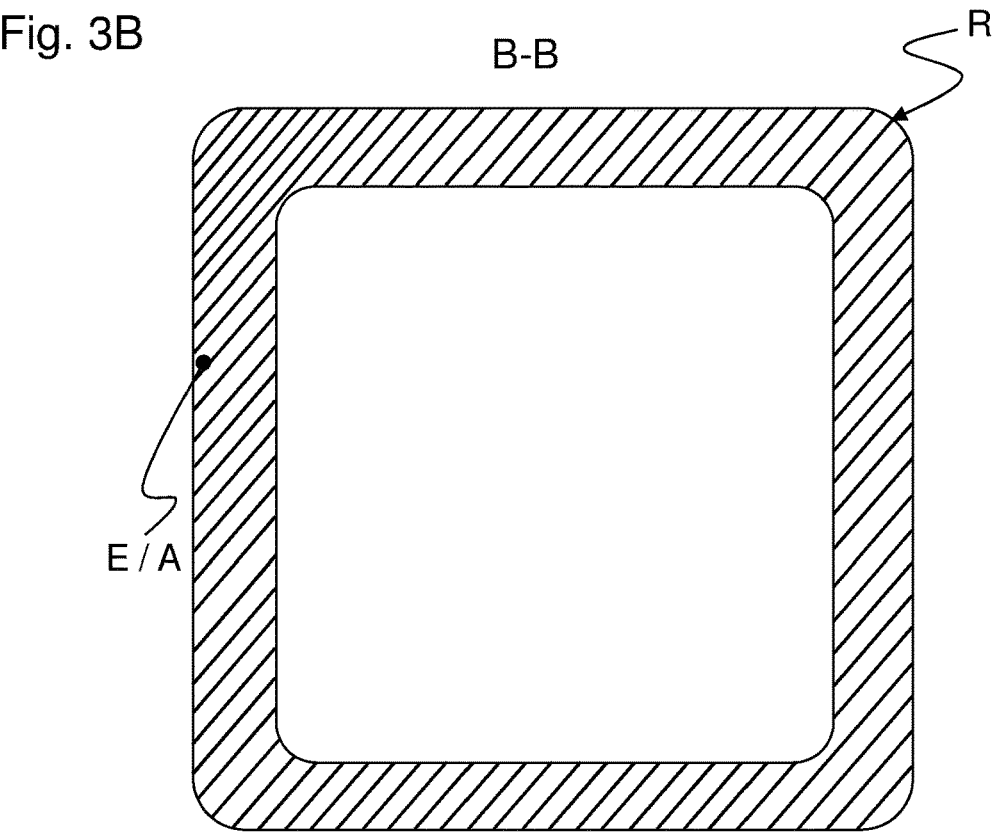
FIG. 3B a schematic sectional view along a line B-B in FIG. 2.

The schematic sectional views in FIGS. 3A and 3B illustrate the construction design of the measurement apparatus 1 in accordance with the invention. FIG. 3A shows the schematic sectional view of the inlet section E of the measurement apparatus 1 along the line A-A. The cross-section Q of the inlet section E at this point is round as a circle and substantially corresponds to the cross-section of the circular line L.

From this point onward, the inlet section E of the measurement apparatus 1 has the first superelliptic transitional shape so that the first superelliptic transitional shape has the rectangular cross-section R as shown in FIG. 3B at the end of the inlet section E and at the transition of the inlet section E to the measurement section M of the measurement apparatus 1. A homogeneous transition having an unchanging cross-sectional area over the total flow path of the measurement apparatus 1 is hereby ensured so that an eddying in the flow profile of the fluid F, in particular within the measurement section M of the measurement apparatus 1, does not arise. This means that no flow breakdown occurs in the flow profile of the fluid F at the transition of the fluid F from the circular line L in the measurement section M of the measurement apparatus 1.

The measurement section M of the measurement apparatus 1 includes the rectangular cross-section R up to the connection to the outlet section A of the measurement apparatus 1. The outlet section A of the measurement apparatus 1 starts with the rectangular cross-section R and has the second superelliptic transitional shape so that the round cross-section Q that corresponds to the round section Q of the circular line L is again present at the end of the outlet section A of the measurement apparatus.

A flow breakdown of the fluid F is hereby avoided along the entire measurement apparatus 1 in accordance with the invention so that an increased measurement quality of the flow rate of the fluid F can be achieved.

Due to the rectangular cross-section R of the measuring section M of the measuring device 1, it is possible to arrange the ultrasonic devices 2 side by side along the outer wall of the rectangular measuring section M of the measuring device 1, as shown in FIG. 3C. As a result, the secant measuring path alignment of the measuring paths 2a of the ultrasonic device 2 can be converted in the rectangular measuring section M of the measuring device 1, wherein the measuring paths 2a extend parallel to the side wall of the rectangular measuring section M of the measuring device 1, wherein the side wall is perpendicular to the wall of the measuring section M of the measuring device 1 on which the ultrasonic devices 2 are arranged.

In contrast to the diametric measurement path alignment of the prior art, the secant measurement paths 2a of the ultrasound devices 2 of the measuring device 1 in FIG. 3C cover the entire flow cross section of the fluid, so that the measurement signal of the inventive measuring device 1 can provide a more accurate mean value of the flow velocity.

REFERENCE NUMERAL LIST 1 measurement apparatus
2 ultrasound device
2a measurement path
A outlet section
E inlet section
F fluid
Fl flange section
L line
M measurement section Q round cross-section
R rectangular cross-section
x, y, z coordinate axis

The invention claimed is:

1. A measurement apparatus for measuring a flow rate of a fluid that flows with a main direction of flow in a circular line, the measurement apparatus comprising
   an inlet section for conducting the fluid from the circular line (L) into the measurement apparatus;
   an outlet section for conducting the fluid from the measurement apparatus into the circular line;
   a measurement section for connecting the inlet section to the outlet section;
   at least one ultrasound device for transmitting and/or receiving ultrasound waves, wherein the ultrasound device is arranged at a wall of the measurement section; and
   an evaluation unit for carrying out a time of flight difference measurement and for determining the flow rate,
   wherein the inlet section has a first superelliptic transitional shape and the outlet section has a second superelliptic transitional shape and the measurement section has a rectangular shape.

2. The measurement apparatus in accordance with claim 1, wherein the measurement apparatus is arranged coaxially to the main flow of the fluid in the circular line.

3. The measurement apparatus in accordance with claim 1, wherein the superelliptic transitional shape is described by means of a formula $$\left(\frac{x}{a_{(z)}}\right)^{n(z)} + \left(\frac{y}{b_{(z)}}\right)^{n(z)} = 1,$$

where a(z), b(z) represent semi-axes of the superelliptic transitional shape, where a(z), b(z), and n(z) are functions of coordinates of a meter axis z facing in the main direction of flow.

4. The measurement apparatus in accordance with claim 1, wherein the ultrasound device is arranged at the wall of the rectangular measurement section such that at least one measurement path of the ultrasound device is directed in parallel with a side wall of the rectangular measurement section.

5. The measurement apparatus in accordance with claim 1, wherein the ultrasound device is arranged at the wall of the rectangular measurement section such that a secant measurement path alignment results in the rectangular measurement section.

6. The measurement apparatus in accordance with claim 1, wherein the first superelliptic transitional shape merges from a round cross-section to a rectangular cross-section.

7. The measurement apparatus in accordance with claim 1, wherein the second superelliptic transitional shape merges from a rectangular cross-section to a round cross-section.

8. A measurement apparatus for measuring a flow rate of a fluid that flows with a main direction of flow in a circular line, the measurement apparatus comprising
   an inlet section for conducting the fluid from the circular line (L) into the measurement apparatus;
   an outlet section for conducting the fluid from the measurement apparatus into the circular line;
   a measurement section for connecting the inlet section to the outlet section;
   at least one ultrasound device for transmitting and/or receiving ultrasound waves, wherein the ultrasound device is arranged at a wall of the measurement section; and
   an evaluation unit for carrying out a time of flight difference measurement and for determining the flow rate,
   wherein the inlet section has a first superelliptic transitional shape and the outlet section has a second superelliptic transitional shape and the measurement section has a rectangular shape with rounded corners.

9. The measurement apparatus in accordance with claim 8, wherein the measurement apparatus is arranged coaxially to the main flow of the fluid in the circular line.

10. The measurement apparatus in accordance with claim 8, wherein the superelliptic transitional shape is described by means of a formula $$\left(\frac{x}{a_{(z)}}\right)^{n(z)} + \left(\frac{y}{b_{(z)}}\right)^{n(z)} = 1,$$

where a(z), b(z) represent semi-axes of the superelliptic transitional shape, where a(z), b(z), and n(z) are functions of coordinates of a meter axis z facing in the main direction of flow.

11. The measurement apparatus in accordance with claim 8, wherein the ultrasound device is arranged at the wall of the rectangular measurement section such that at least one measurement path of the ultrasound device is directed in parallel with a side wall of the rectangular measurement section.

12. The measurement apparatus in accordance with claim 8, wherein the ultrasound device is arranged at the wall of the rectangular measurement section such that a secant measurement path alignment results in the rectangular measurement section.

13. The measurement apparatus in accordance with claim 8, wherein the first superelliptic transitional shape merges from a round cross-section to a rectangular cross-section.

14. The measurement apparatus in accordance with claim 8, wherein the second superelliptic transitional shape merges from a rectangular cross-section to a round cross-section.

* * * * *